US010884754B2

(12) United States Patent
Alexander et al.

(10) Patent No.: US 10,884,754 B2
(45) Date of Patent: *Jan. 5, 2021

(54) INFINITE PROCESSOR THREAD BALANCING

(71) Applicant: INTERNATIONAL BUSINESS MACHINES CORPORATION, Armonk, NY (US)

(72) Inventors: Gregory W. Alexander, Pflugerville, TX (US); Stephen Duffy, Bethesda, MD (US); David S. Hutton, Tallahassee, FL (US); Christian Jacobi, West Park, NY (US); Anthony Saporito, Highland, NY (US); Somin Song, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/674,237

(22) Filed: Nov. 5, 2019

(65) Prior Publication Data

US 2020/0073670 A1    Mar. 5, 2020

Related U.S. Application Data

(63) Continuation of application No. 15/428,441, filed on Feb. 9, 2017, now Pat. No. 10,558,464.

(51) Int. Cl.
*G06F 9/38* (2018.01)
*G06F 9/50* (2006.01)

(52) U.S. Cl.
CPC .......... *G06F 9/3851* (2013.01); *G06F 9/3857* (2013.01); *G06F 9/3863* (2013.01); *G06F 9/5083* (2013.01)

(58) Field of Classification Search
None
See application file for complete search history.

(56) References Cited

U.S. PATENT DOCUMENTS

| 7,925,860 B1 * | 4/2011 | Juffa | G06F 9/3887 712/10 |
| 9,043,801 B2 * | 5/2015 | Kupferschmidt | G06F 9/5027 718/105 |

(Continued)

OTHER PUBLICATIONS

List of IBM Patents or Patent Applications Treated As Related; Date Filed: Nov. 5, 2019, 2 pages.

*Primary Examiner* — Michael Sun
(74) *Attorney, Agent, or Firm* — Cantor Colburn LLP; William Kinnaman

(57) ABSTRACT

Embodiments include load-balancing a plurality of simultaneous threads of a processor. An example method includes computing a minimum group count for a thread from the plurality of threads. The minimum group count indicates a minimum number of groups of instructions to be assigned to the thread. The method further includes computing a maximum allowed group count for the thread. The maximum allowed group count indicates a maximum number of groups of instructions to be assigned to the thread. The method further includes issuing one or more groups of instructions for execution by the thread based on the minimum group count and the maximum allowed group count for the thread.

20 Claims, 11 Drawing Sheets

(56) References Cited

U.S. PATENT DOCUMENTS

| | | | |
|---|---|---|---|
| 2003/0233394 A1 | 12/2003 | Rudd et al. | |
| 2004/0128488 A1* | 7/2004 | Thimmannagari | G06F 9/3851 712/235 |
| 2006/0179279 A1 | 8/2006 | Jones | |
| 2006/0236135 A1 | 10/2006 | Jones | |
| 2007/0198785 A1* | 8/2007 | Kogge | G06F 9/547 711/154 |
| 2010/0161948 A1 | 6/2010 | Abdallah | |
| 2014/0092091 A1* | 4/2014 | Li | G06T 15/60 345/423 |
| 2014/0282566 A1* | 9/2014 | Lindholm | G06F 9/3851 718/102 |
| 2016/0092263 A1* | 3/2016 | Gleyzer | G06F 9/46 718/102 |
| 2018/0225119 A1 | 8/2018 | Alexander | |
| 2018/0286110 A1 | 10/2018 | Doyle | |

* cited by examiner

| Thread ID | Min. Group Count | Max Allowed Group Count | Number of Groups in Pipeline |
|---|---|---|---|
| Thread 0 | Min0 | Max0 | G0 |
| Thread 1 | Min1 | Max1 | G1 |
| Thread 2 | Min2 | Max2 | G2 |
| Thread 3 | Min3 | Max3 | G3 |

FIG. 4

INFINITE PROCESSOR THREAD BALANCING

DOMESTIC PRIORITY

This application is a continuation of U.S. Non-Provisional application Ser. No. 15/428,441, filed Feb. 9, 2017, which is incorporated herein by reference in its entirety.

BACKGROUND

The present application generally relates to computing technology, and more specifically, to management of threads in processors that facilitate simultaneous multithreading.

Present-day high-speed processors include the capability of simultaneous execution of instructions, speculative execution and loading of instructions and simultaneous operation of various resources within a processor. In particular, it has been found desirable to manage execution of one or more threads within a processor, so that more than one execution thread may use the processor and so that resources are used more effectively than they are typically by a single thread.

SUMMARY

According to one or more embodiments, a method for load-balancing a plurality of simultaneous threads of a processor includes computing a minimum group count for a thread from the plurality of threads. The minimum group count indicates a minimum number of groups of instructions to be assigned to the thread. The method further includes computing a maximum allowed group count for the thread. The maximum allowed group count indicates a maximum number of groups of instructions to be assigned to the thread. The method further includes issuing one or more groups of instructions for execution by the thread based on the minimum group count and the maximum allowed group count for the thread.

Further one or more embodiments of a processing system that load-balances a plurality of simultaneous threads of a processor are described. The processing system may include one or more processors. Each of the processors include components for simultaneous multithreading. For example, a processor includes an instruction fetch unit (IFU) and an instruction decoding unit. In one or more examples, the IFU computes a minimum group count for a thread from the plurality of threads. The minimum group count indicates a minimum number of groups of instructions to be assigned to the thread. The IFU further computes a maximum allowed group count for the thread. The maximum allowed group count indicates a maximum number of groups of instructions to be assigned to the thread. The instruction decoding unit issues one or more groups of instructions for execution by the thread based on the minimum group count and the maximum allowed group count for the thread.

Further yet, one or more embodiments are described for a computer program product for load-balancing a plurality of simultaneous threads of a processor. The computer program product includes a computer readable storage medium. The computer readable storage medium includes instructions to compute a minimum group count for a thread from the plurality of threads. The minimum group count indicates a minimum number of groups of instructions to be assigned to the thread. The computer readable storage medium further includes instructions to compute a maximum allowed group count for the thread. The maximum allowed group count indicates a maximum number of groups of instructions to be assigned to the thread. The computer readable storage medium further includes instructions to issue one or more groups of instructions for execution by the thread based on the minimum group count and the maximum allowed group count for the thread.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

FIG. 4 illustrates an example depiction of the attributes maintained for each thread, in accordance with one or more embodiments.

DETAILED DESCRIPTION

Figure 1:
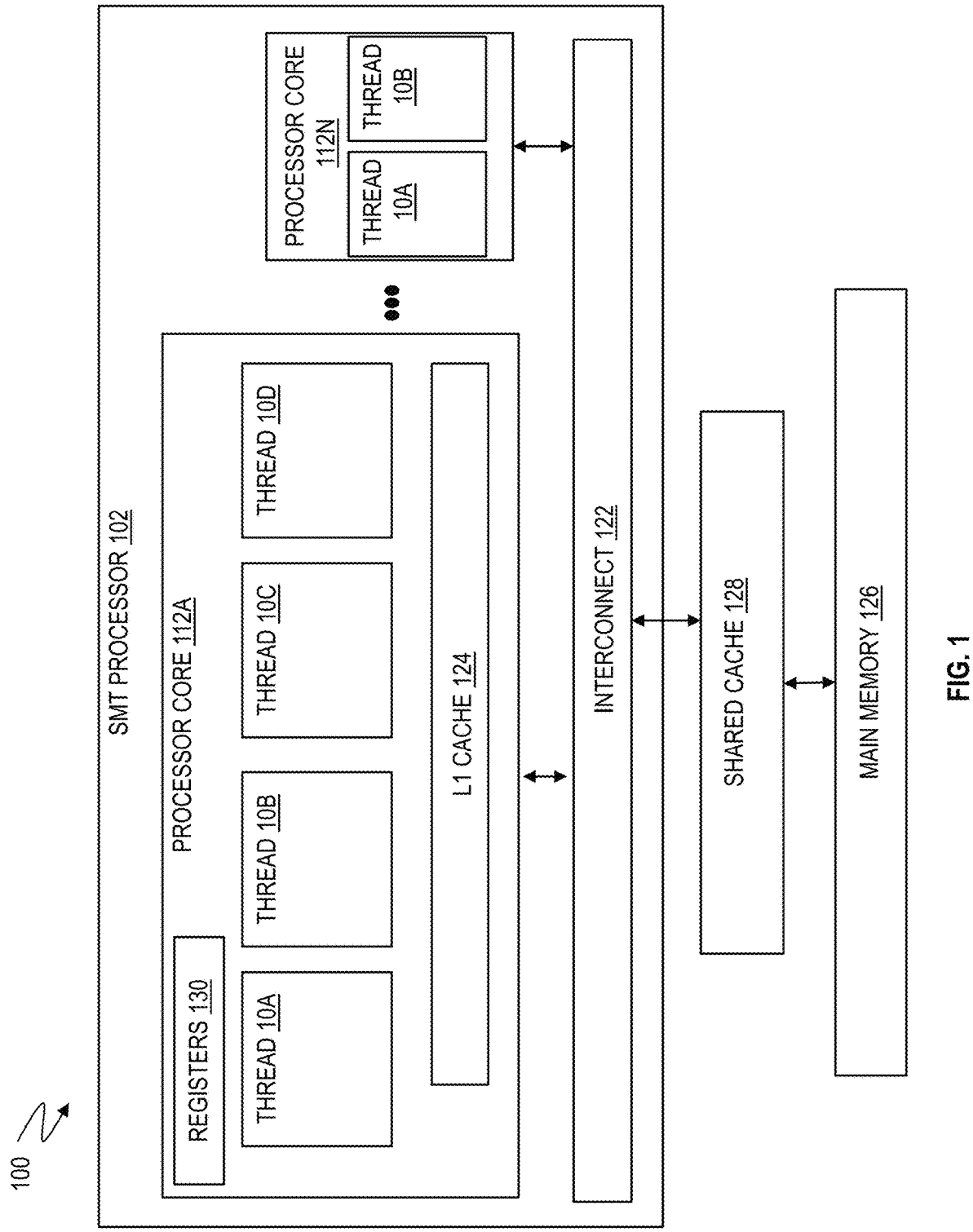
FIG. 1 is a high level diagram of a plurality of threads being scheduled for concurrent execution on an SMT processor, in accordance with one or more embodiments.

Described here are technical solutions for balancing threads being executed by a simultaneous multi-threaded (SMT) processor. As such the technical solutions are rooted in and/or tied to computer technology in order to overcome a problem specifically arising in the realm of computers, specifically processor architecture and thread management.

An SMT processor provides efficient use of processor resources, as multiple threads may simultaneously use processor resources. Multiple threads are concurrently executed in the SMT processor so that multiple processor execution units, such as floating point units, fixed point instruction units, load/store units and others can be performing tasks for one (or more depending on the execution units' capabilities) of multiple threads simultaneously.

SMT is a technique that permits multiple independent threads to issue multiple instructions each cycle to a processor's functional units. SMT combines multiple-instruction features of the processors with the latency-hiding ability of multithreaded architectures. Unlike conventional multithreaded architectures, which depend on fast context switching to share processor execution resources, all hardware contexts in an SMT processor are active simultaneously, competing each cycle for all available resources. This dynamic sharing of the functional units allows simultaneous multithreading to substantially increase throughput, attacking the two major impediments to processor utilization—long latencies and limited per-thread parallelism. Multiple SMT processors can be included in a computer system allowing the computer to perform simultaneous multithreading on a plurality of computers.

A challenge, however, faced by computers with a plurality of SMT processors is that the software threads being executed by the SMT processor contend for some of the same processor-based resources, such as functional and execution units. As used herein, the term "thread" refers to a software thread, unless otherwise noted. If two threads are both repeatedly contending for the same processor-based resource, one thread has to wait (or gets swapped out) while the other thread uses the resource. Waiting for resources decreases overall system throughput as well as the efficiency of the individual threads. In a multi-processor environment, a thread may not perform well on a given SMT processor because of the other threads that are running on that processor. For example, without any intervention, one thread may occupy the majority of the shared resources and cause performance degradation on other threads.

The technical solutions described herein improve the efficiency of an SMT processor by facilitating a thread to perform at its peak speed without interfering with other threads and prevents a severe imbalance of the multiple threads.

The example implementations described herein, in an SMT processor of an SMT environment, each processor core can execute one or more threads, or sequences of instructions, in a substantially parallel manner. Each processor core can employ a processing pipeline, where instructions from each thread are grouped for parallel processing. As one example, a processing pipeline can incorporate a number of units or stages to fetch, decode, dispatch, issue, execute, complete, checkpoint, writeback, transfer, and commit results of the instructions. Instructions can be dispatched in order as groups of instructions but executed out of order when there are no dependencies between the instructions.

FIG. 1 depicts an example of an SMT multicore environment 100 according to an embodiment. The SMT multicore environment 100 includes multiple instances of an SMT processor 102. FIG. 1 shows many SMT processor cores 112A through 112N (generally referred to as SMT processor cores 112 or processor cores 112) on one SMT processor die or SMT processor 102, connected with an interconnect 122, under management of an interconnect control (not shown). Each processor core 112 may have an instruction cache for caching instructions from memory to be executed and a data cache for caching data (operands) of memory locations to be operated on by the processor core 112. In one or more examples, caches of multiple SMT processors 102 are interconnected to support cache coherency between the caches of the multiple SMT processors 102. The processor core 112 caches may include one or more levels of caching in a hierarchical cache structure. For example, each SMT processor 102 may employ a shared cache 128 to be shared among all or a subset of the processor cores 112 on the SMT processor 102 between the SMT processor 102 and main memory 126. Additionally, each processor core 112 may have its own L1 cache 124 directly on the processor core 112, where the L1 cache 124 is not shared among the different processor cores 112 but is a core-internal cache. Also, each processor core 112 may have one or more registers 130 for storing small amounts of data, status, and configuration information.

It is understood that the processor cores 112 are physical devices that include all the circuitry (i.e., hardware along with firmware) necessary to execute instructions as understood by one skilled in the art.

Although the SMT processor 102 may include multiple processor cores 112, various examples may be provided with reference to processor core 112A for ease of understanding and not limitation. It is understood that further details shown and discussed relative to processor core 112A apply by analogy to all processor cores 112, and these details may be included in all of the processor cores 112.

The processor core 112A is shown with four threads 10A, 10B, 10C, and 10D (also referred to as thread0, thread1, thread2, and thread3, and generally referred to as thread or threads 10), and each thread 10A-10D includes a separate sequence of instructions or instruction stream, such as a program or portion thereof. Each processor core 112A-112N may be configured to support different levels of SMT, i.e., a different number of threads 10. In the example of FIG. 1, processor core 112A is in SMT-4 mode, meaning that four threads 10A-10D are configured to execute in parallel, while processor core 112N is in SMT-2 mode with threads 10A and 10B. A processor core 112 may be configured in a single thread mode or a higher order mode with a higher number of threads depending upon implementation.

At an architecture level, each thread 10 may represent an independent central processing unit (CPU). Instructions which the thread 10 has for execution by the processor core 112 can include a number of instruction classes, such as: general, decimal, floating-point-support (FPS), binary-floating-point (BFP), decimal-floating-point (DFP), hexadecimal-floating-point (HFP), control, and I/O instructions. The general instructions can be used in performing binary-integer arithmetic operations and logical, branching, and other non-arithmetic operations. The decimal instructions operate on data in decimal format. The BFP, DFP, and HFP instructions operate on data in BFP, DFP, and HFP formats, respectively, while the FPS instructions operate on floating-point data independent of the format or convert from one format to another. To achieve higher throughput, various resource units of each processor core 112 are accessed in parallel by executing one or more of the instructions in a thread 10 using a processing pipeline and through out-of-sequence execution as further described in reference to FIG. 2.

Figure 2:
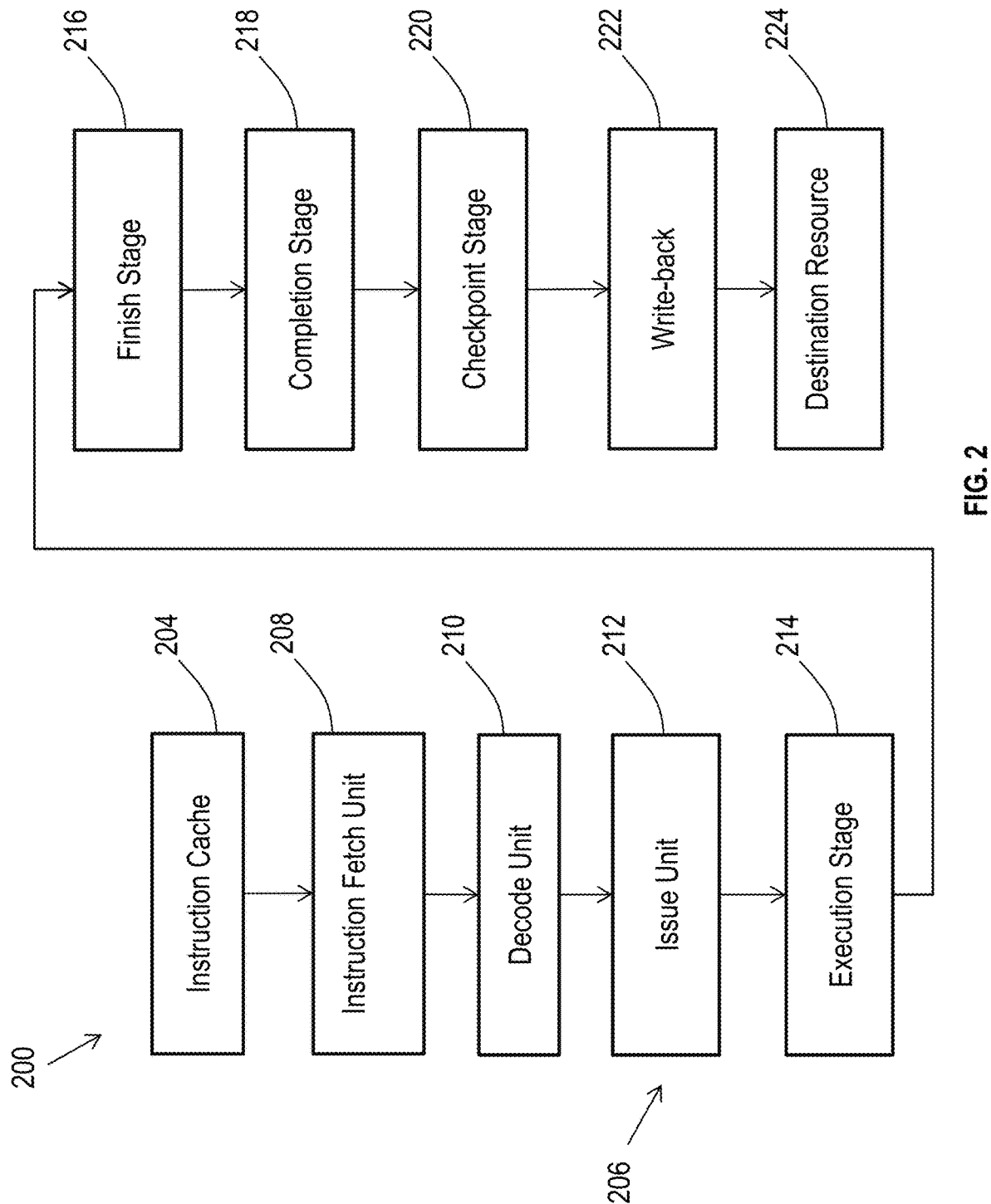
FIG. 2 depicts an example of a portion of a processing pipeline 206 of a processing sequence 200 of the processor core, in accordance with one or more embodiments.

FIG. 2 depicts an example of a portion of a processing pipeline 206 of a processing sequence 200 of the processor core 112 of FIG. 1 in accordance with an embodiment. An instruction cache 204 may hold a sequence of instructions for one or more of the threads 10 of FIG. 1. An instruction fetch unit 208 may fetch instructions from the instruction cache 204 and provide the fetched instructions to a decode unit 210. The decode unit 210 decodes the instructions and form groups of instructions to be dispatched. Groups of instructions can be tracked in a storage structure, such as a global completion table, as further described herein. The processing pipeline 206 may include out-of-order processing that can be performed on groups of instructions, such as issuing the instructions by an issue unit 212. The issue unit 212 analyzes the instructions or other data and transmits the decoded instructions, portions of instructions, or other data to one or more execution units in an execution stage 214 based on the analysis. The execution stage 214 executes the instructions. The execution stage 214 may include a plurality of execution units, such as fixed-point execution units, floating-point execution units, and load/store execution units.

A finish stage 216 can track finishing execution of individual instructions in groups of instructions. Once all instructions in a group of instructions finish execution, the group of instructions completes in program order such that older groups in a sequence of instructions complete before a younger group of instructions, as managed by completion stage 218. Upon completion, the completion stage 218 can provide results and instruction information for checkpointing at checkpoint stage 220, as well as release group management resources for reuse. The checkpoint stage 220 can store information to establish a recovery state, such as a next instruction address to execute and various register status values after completion. Write-back logic 222 may write results of instruction execution back to a destination resource 224. The destination resource 224 may be any type of resource, including registers, cache memory, other memory, I/O circuitry to communicate with other devices, other processing circuits, or any other type of destination for executed instructions or data.

The processing pipeline 206 can include other features, such as error checking and handling logic, one or more parallel paths through the processing pipeline 206, and other features known in the art. Multiple forward paths through the processing pipeline 206 may enable multiple threads or multiple instruction groups of the same thread to be executed simultaneously. While a forward path through the processing sequence 200 is depicted in FIG. 2, other feedback and signaling paths may be included between elements of the processing sequence 200.

Figure 3:
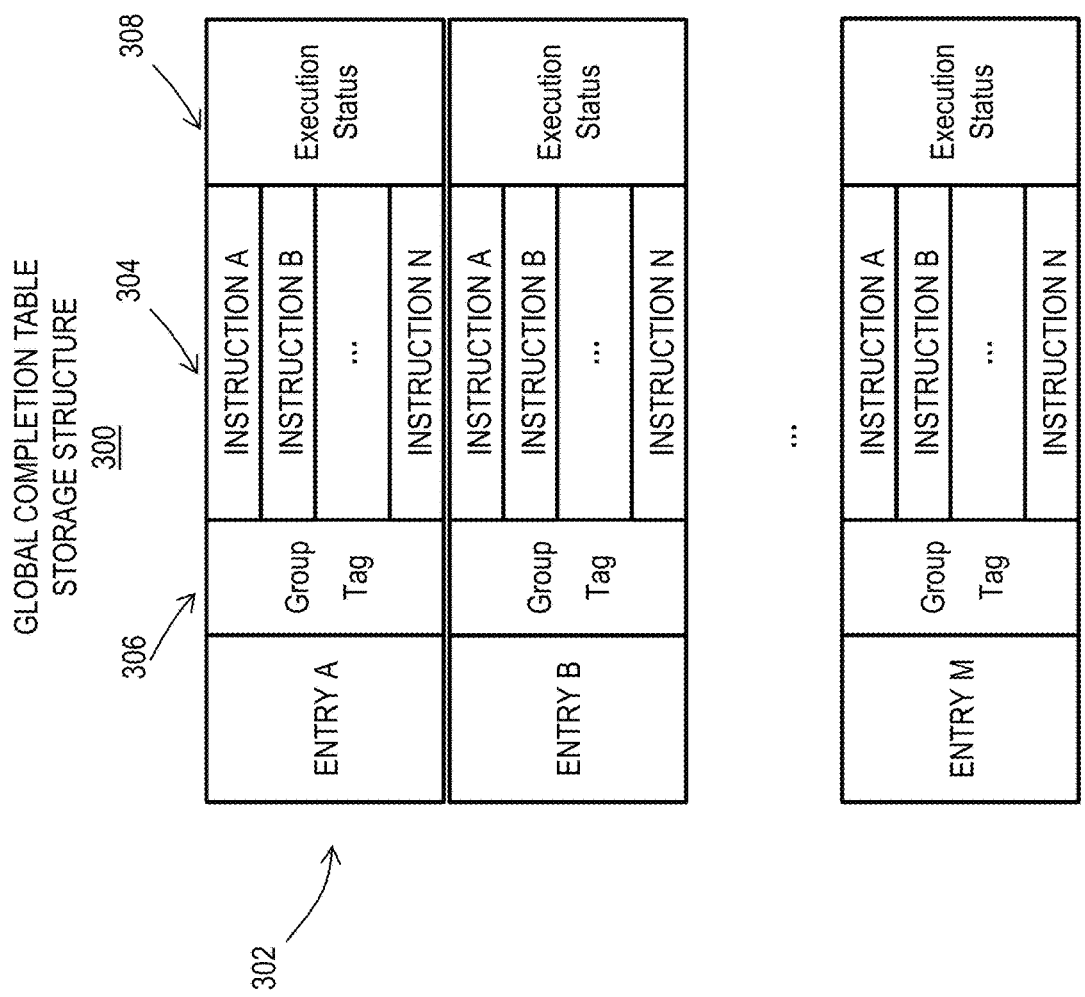
FIG. 3 depicts a storage structure 300 to support instruction completion, in accordance with one or more embodiments.

FIG. 3 depicts a storage structure 300 to support instruction completion in accordance with an embodiment. The storage structure 300 is an example of a global completion table (GCT) that includes a plurality of entries 302, where each of the entries 302 can include tracking data for a group of instructions 304. Each group of instructions 304 may have a group tag 306 or identifier that establishes a link to a particular thread 10 of FIG. 1 and a relative sequence between groups for the same thread 10. The entries 302 need not be populated sequentially, as the group tag 306 can establish sequencing regardless of position within the storage structure 300. The storage structure 300 can also include an execution status 308 that may be defined at a group and/or instruction level. In order for a group of instructions 304 to complete, all of the instructions within the group of instructions 304 must finish. The storage structure may be populated during dispatch by the decode unit 210 of FIG. 2 and updated by the finish stage 216 and completion stage 218 of FIG. 2. Thus, the entries 302 of the GCT 300 keep track of valid (live) instructions within the SMT processor 112.

In addition, the SMT processor 112, for example via the IFU 208 monitors, maintains, and adjusts attributes for each of the threads 10A-D. FIG. 4 illustrates an example depiction of the attributes maintained for each thread including the minimum group count, maximum allowed group count, and number of current groups. It should be noted that in other examples, additional attributes may be maintained. Further, although FIG. 4 depicts a table, the attributes may be stored using any other data structure in other examples.

Figure 5:
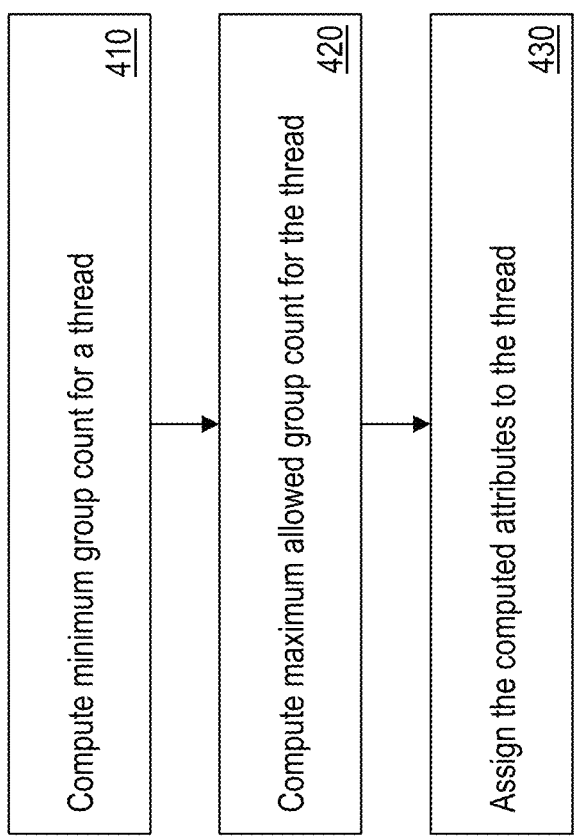
FIG. 5 illustrates a flowchart of an example method for determining and assigning attributes to each of the threads for balancing the threads in the SMT processor, in accordance with one or more embodiments.

FIG. 5 illustrates a flowchart of an example method for determining and assigning attributes to each of the threads for balancing the threads in the SMT processor 112A. In one or more examples, the attributes for each thread include a minimum group count, an allowed group count, and a number of groups in the pipeline.

In one or more examples, the IFU 208 determines the values for the attributes for each thread. For example, referring to FIG. 5, the IFU 208 determines the minimum group count for a thread based on completion rate of the thread, as shown at 410. The minimum group count is used to ensure that the thread can be assigned a number of groups that is more than the thread's current performance rate. Further, the IFU 208 computes the maximum allowed group count for each thread based on one or more events detected, as shown at 420. The IFU 208 assigns the computed attribute values to the corresponding threads to facilitate the decode unit 210 to assign groups of instructions to the one or more threads according to the attributes, as shown at 430.

Figure 6:
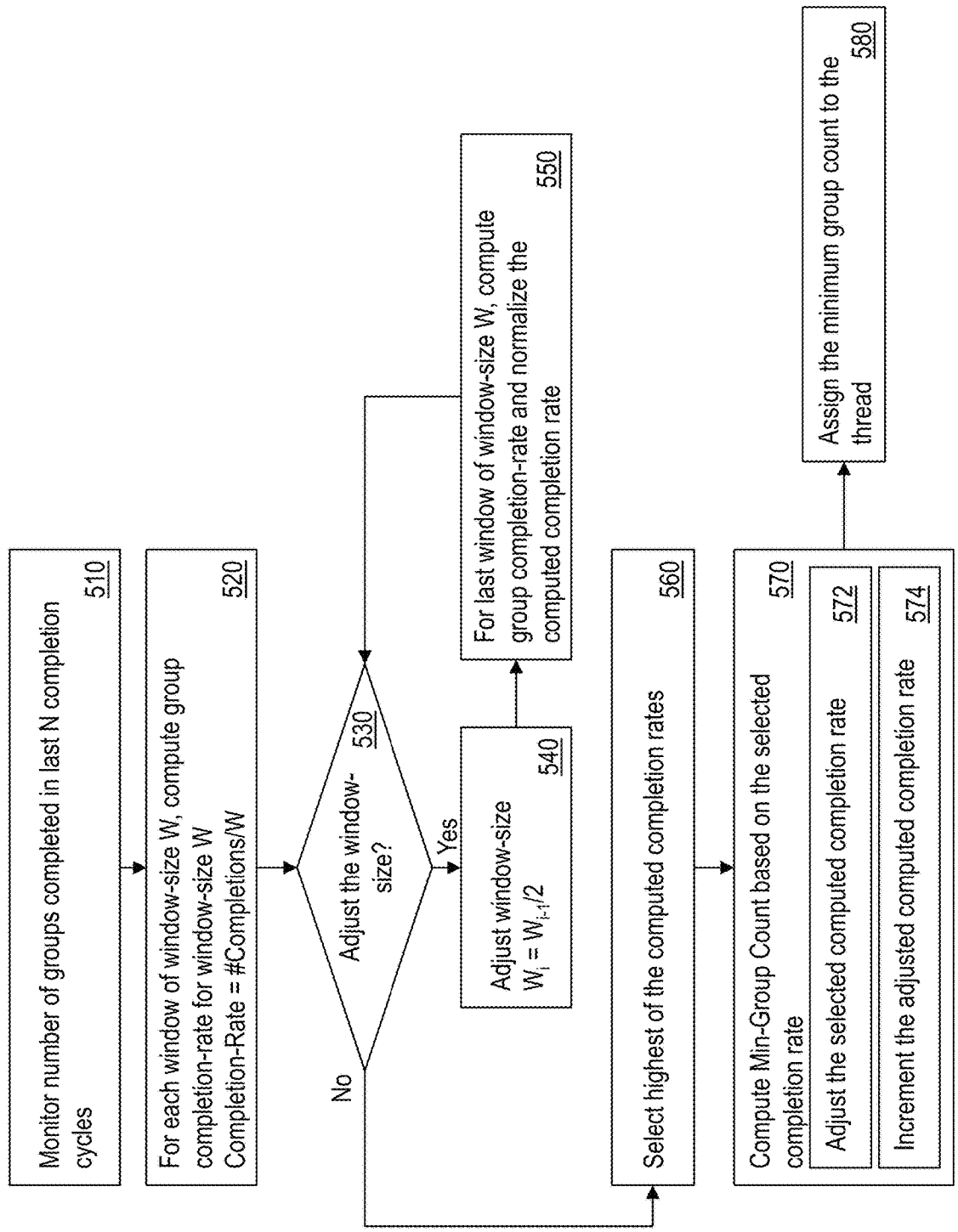
FIG. 6 illustrates a flowchart of an example method for determining the minimum group count for a thread, in accordance with one or more embodiments.
Figure 7:
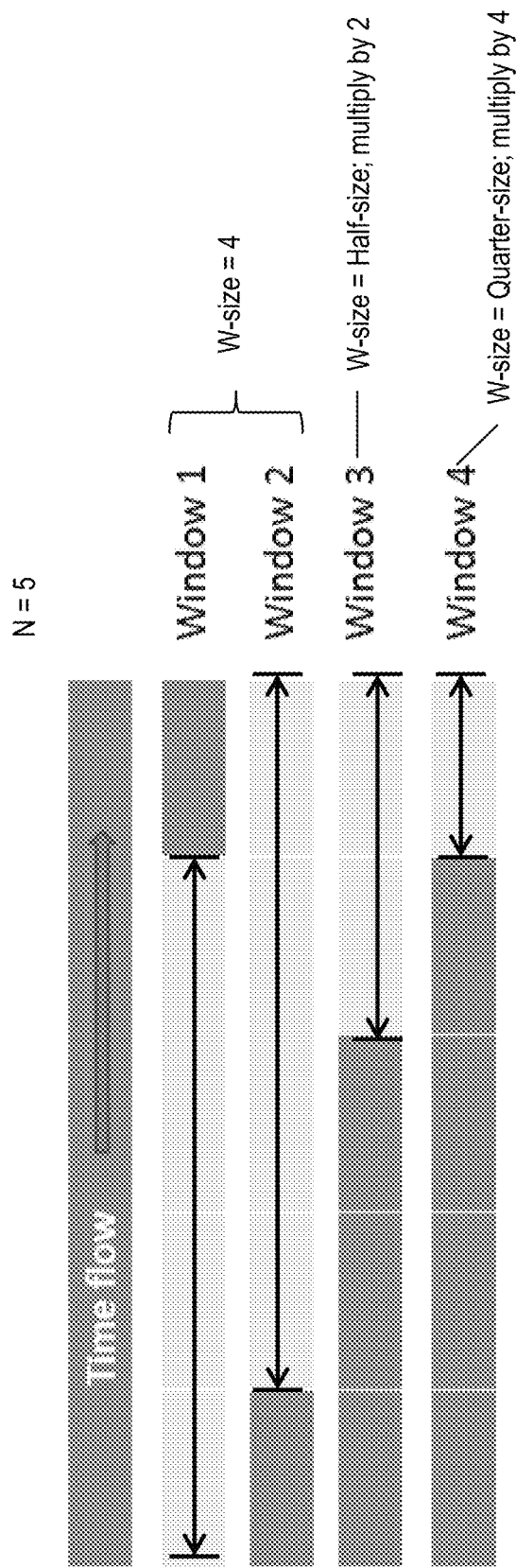
FIG. 7 illustrates an example scenario for computing the minimum group counts according to the flowchart of FIG. 6, in accordance with one or more embodiments.

FIG. 6 illustrates a flowchart of an example method for determining the minimum group count for a thread. FIG. 7 illustrates an example scenario for computing the minimum group counts according to the flowchart of FIG. 6. For example, referring to FIG. 6, the IFU 208 monitors a moving window of last N attempted completion cycles for counts of the number of groups that have completed execution, as shown at 510. The IFU 208 computes a completion rate for each window, based on the window size of W, as shown at 520. For example, completion rate=(Number of Completions)/W. In one or more examples, the window size W is initially configured to a default predetermined value, such as 2, 4, 8, or any other value. Similarly, the number of last cycles to be observed is set to according to a predetermined value, such as 2, 4, 5, 8, or any other.

For example, in FIG. 7, W is initially set to W0=4, and N is set to 5. It is understood that in other examples, different initial values may be selected. Accordingly, the IFU observes the last 5 cycles for the number of completed groups, using a window size of 4. In the illustrated example, based on the values of N and W, the IFU 208 computes the completion rates CR1 and CR2 are computed respectively for two windows—window 1 and window 2.

In one or more examples, the IFU 208 checks if the window size is to be adjusted for computing additional completion rates, as shown at 530. Using a variety of window sizes improves the robustness of the minimum group count value assigned to the thread. If the window size is to be adjusted, the IFU 208 adjusts the window size W for computing additional completion rates, as shown at 540. For example, the IFU adjusts the window size to half ($W_i = W_{i-1}/2$). In other examples, the window size may be adjusted in a different manner, such as computing a third of the window size, scaling the window size up, or any other different manner.

The IFU 208 subsequently uses the updated window size $W_{i-1}$ to compute group completion rates as described earlier in the case of $W_i$, as shown at 550. In one or more examples, the IFU 208 normalizes the completion rates computed using a scaling factor based on the window sizes. For example, if the updated $W_i$ is half of the original window size $W_0$, the completion rates computed are scaled by 2. In other words, the scaling factor for the completion rates for the window size $W_i$ is $S_i = W0/W_i$.

For example, as can be seen in FIG. 7, window-3 and window-4 are half and quarter of the originally selected $W_0=4$, size respectively.

The process continues to compute completion rates for different window sizes in this manner until the window size is no longer to be adjusted, as shown at 530. For example, when the window size reaches a minimum size, such as 1, the window size is not adjusted any further.

Once the completion rates are computed in this manner, the IFU 208 selects a completion rate that is the highest from those computed, as shown at 560. The IFU 208 further computes the minimum group count for the thread based on the selected completion rate, as shown at 570. For example, computing the minimum group count includes adjusting the selected computed completion rate, as shown at 572. For example, the adjustment may be to scale the completion rate, such as by half, or any other predetermined scaling factor. Further, the IFU 208 increments the adjusted computed completion rate to ensure that the minimum count is at least more than the current performance rate of the thread. The IFU 208 assigns the computed minimum group count to the thread, as shown at 580.

Figure 8:
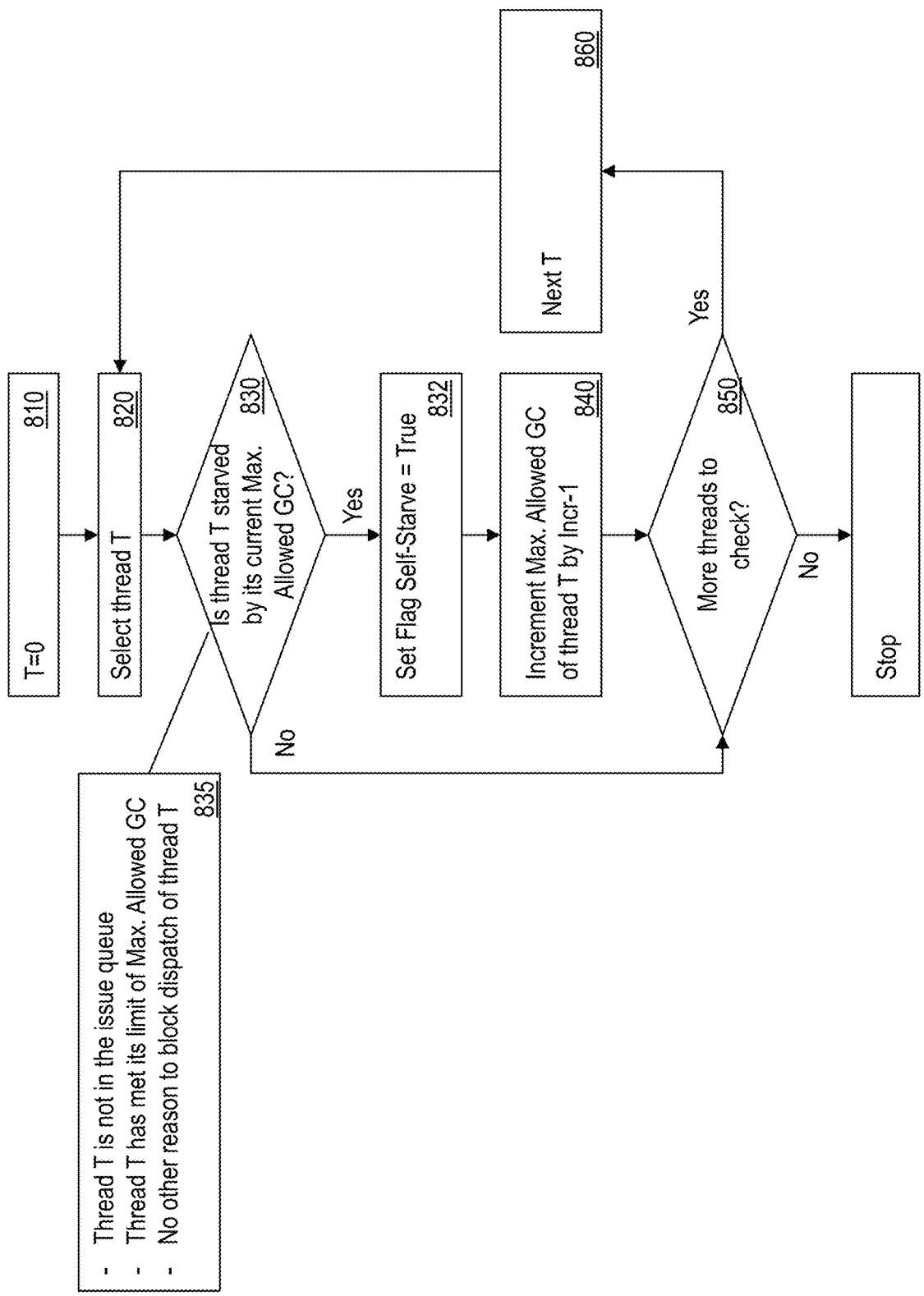
FIG. 8 illustrates a flowchart of an example method for computing the maximum allowed group counts for each thread, in accordance with one or more embodiments.

FIG. 8 illustrates a flowchart of an example method for computing the maximum allowed group counts for each thread. In one or more examples, the IFU 208 loops through all of the threads, starting at a first thread, say thread 0, as shown at 810 and 820. The IFU 208 determines whether the selected thread T is starved by its current maximum allowed group count value, as shown at 830. For example, the IFU determines such a starvation by checking if thread T has an empty issue queue, thread T has met its limit of maximum allowed group count, and that there is no other reason to block dispatch for thread T, as shown at 835. The IFU may determine the current value of the maximum allowed group count and the current group count values of thread T from the values monitored. (FIG. 4). In one or more examples, the IFU 208 maintains a flag, such as a bit value, a byte value, or any other flag that is indicative of whether any one of the threads is self-starving. Accordingly, the IFU 208, in response to detecting that thread T is being starved because of its current maximum allowed group count value, sets the self-starve flag to TRUE, as shown at 832.

If the IFU 208 determines that the thread T is being starved because the currently assigned maximum allowed group count value is limiting the thread T, the IFU 208 increments the value by a predetermined increment, as shown at 840. For example, the predetermined increment value may be 1, 2, 4, or any other positive integer. The IFU 208 further proceeds to perform a similar check for the remaining threads of the processor 112, as shown at 850 and 860. The IFU 208 also checks the remaining threads in case it is determined that thread T is not being starved by its currently assigned maximum allowed group count, as shown at 830, 850, and 860.

Figure 9:
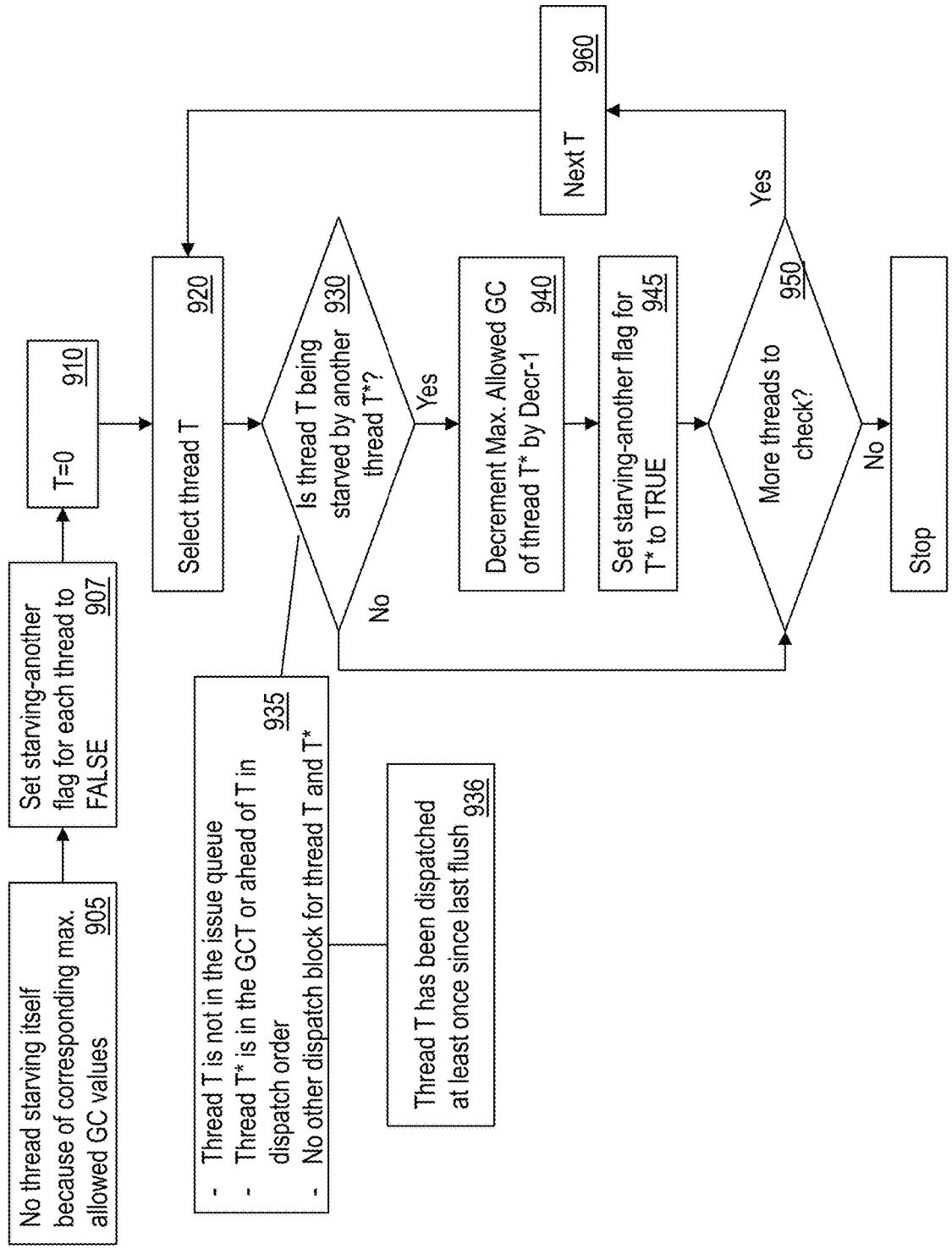
FIG. 9 illustrates a flowchart of an example method for adjusting the maximum allowed group count value of a thread in case the thread is starving another thread, in accordance with one or more embodiments.

The IFU 208 adjusts the maximum allowed group count value for the one or more threads of the processor 112 if one of the threads is being starved because of another thread. FIG. 9 illustrates a flowchart of an example method for adjusting the maximum allowed group count value of a thread in case the thread is starving another thread. In one or more examples, the IFU 208 initially checks if any thread is self-starving, as shown at 905. For example, the IFU 208 may make the determination based on the self-starve flag. Alternatively, or in addition, the IFU 208 may execute the method described earlier (FIG. 8).

If there are no threads that are self-starving (that is the self-starve flag is FALSE), the IFU 208 sets a starving-another flag for each respective thread to FALSE, as shown at 907. The IFU 208 further checks each thread to determine if a thread is being starved by another thread, or in other words if a thread is starving any other thread, as shown at 930. For example, the IFU 208 further loops through each thread by selecting a first thread from the threads, as shown at 910 and 920. The IFU 208 compares each pair of threads T and T*, as shown at 930. The IFU 208 determines that thread T is being starved by thread T*, if thread T is not in the issue queue, thread T* is in the GCT 300 or ahead of T in dispatch order, and there is no other dispatch block for thread T and thread T*, as shown at 935. In one or more examples, the IFU 208 may also check if thread T has been dispatched at least once since the last flush of the instruction pipeline by the processor, as shown at 936.

If the IFU 208 determines that thread T is being starved by thread T* based on detecting the above conditions, the IFU 208 decrements the maximum allowed group count of thread T* by a predetermined value, as shown at 940. In addition, the IFU 208 sets the starving-another flag for T* to TRUE because T* is starving T, as shown at 945. In either case, the IFU 208 continues to check the next pair of threads by selecting a next thread until all pairs are checked, as shown at 950 and 960.

Figure 10:
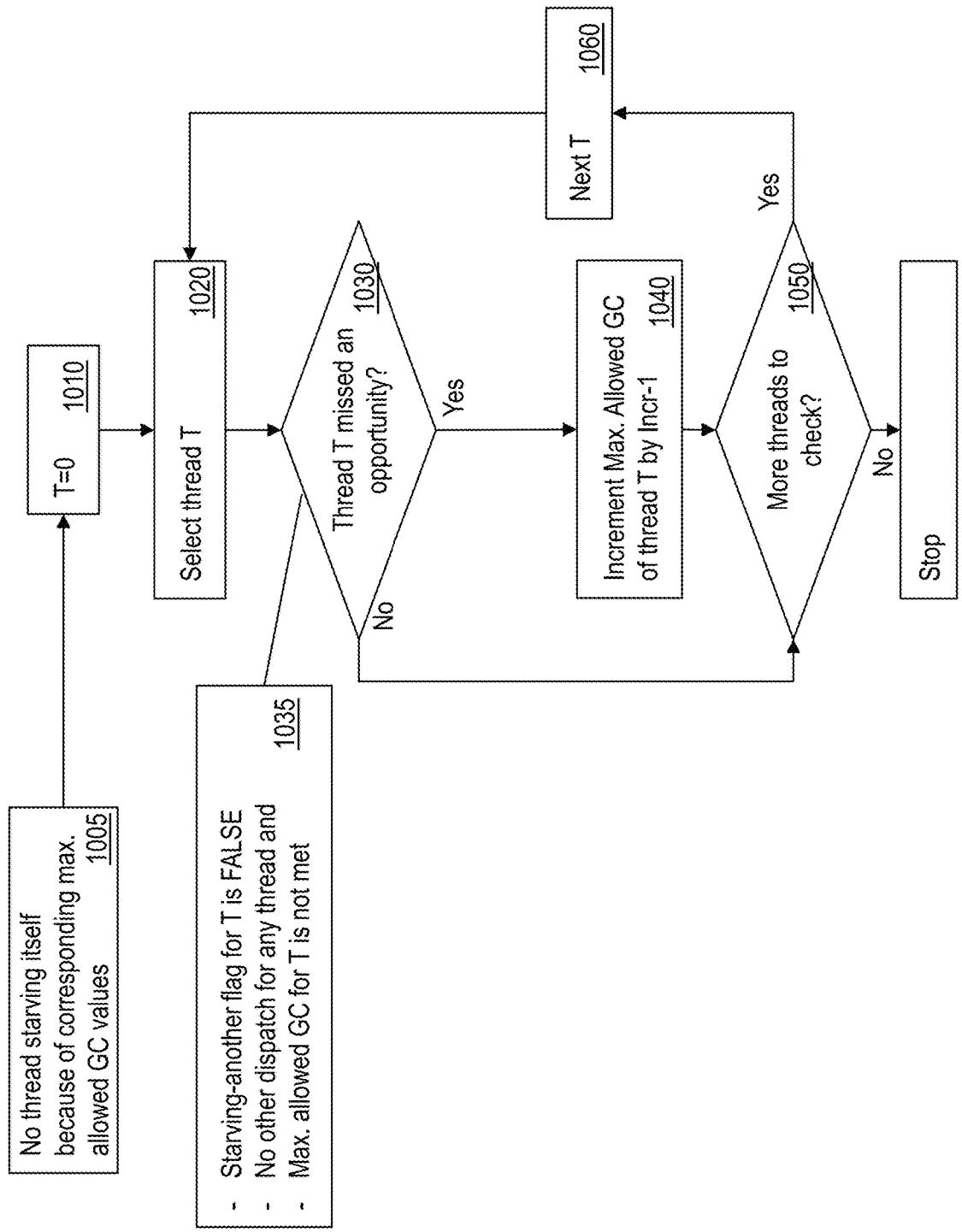
FIG. 10 illustrates a flowchart of an example method for the IFU to determine if a thread missed an opportunity to improve performance because of its maximum allowed group count, in accordance with one or more embodiments.

FIG. 10 illustrates a flowchart of an example method for the IFU 208 to determine if a thread missed an opportunity to improve performance because of its maximum allowed group count. A missed opportunity may be an instruction cycle during which the thread did not execute or dispatch an instruction. In one or more examples, the IFU 208 ensures that no thread is self-starving itself because of corresponding maximum allowed group count values, as shown at 1005. In one or more examples, the IFU 208 makes the determination based on the self-starving flag described earlier. The IFU 208 further loops through each thread by selecting a first thread from the threads, as shown at 1010 and 1020. For each thread T, the IFU 208 determines whether the thread T missed an opportunity to execute one or more groups, as shown at 1030.

In one or more examples, the IFU 208 determines that thread T missed an opportunity if the starving-another flag for T is FALSE, there has been no other dispatch for any thread, and if the maximum allowed group count for thread T is not met, as shown at 1035. If all the conditions are met, the IFU 208 increments the maximum allowed group count of thread T by a predetermined value, as shown at 1040. In one or more examples, the predetermined value is the same predetermined value as in case the thread is being self-starving. In either case, the IFU 208 continues to check the next pair of threads by selecting a next thread until all threads are checked, as shown at 1050 and 1060.

Figure 11:
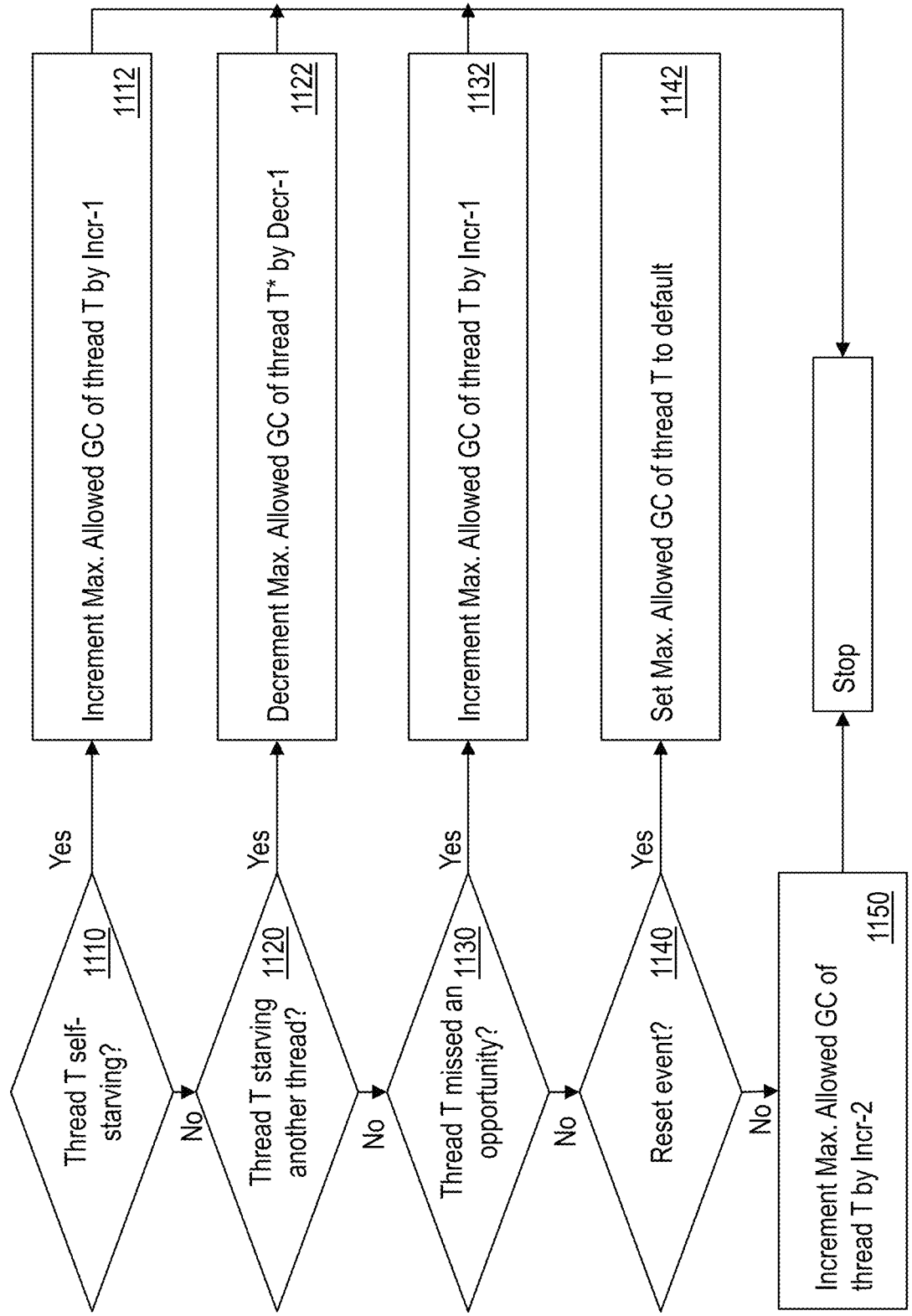
FIG. 11 illustrates a flowchart of an example method for adjusting the maximum allowed group count of a thread, in accordance with one or more embodiments.

FIG. 11 illustrates a flowchart of an example method for adjusting the maximum allowed group count of a thread T. The IFU 208 checks if the thread T is self-starving, as shown at 1110. The determination is made as described herein (FIG. 8). If the thread T is self-starving, the IFU 208 increments the maximum allowed group count of thread T by a first predetermined value, as shown at 1112. Else, if thread T is not self-starving, the IFU 208 checks if the thread T is starving another thread, as shown at 1120. This may be determined as described herein (FIG. 9). If the thread T is starving another thread, the IFU 208 decrements the maximum allowed group count of thread T by a second predetermined value, as shown at 1122. In one or more examples, the first and second predetermined values maybe be identical. Further, if thread T is not starving another thread, the IFU 208 checks if the thread T missed an opportunity, as shown at 1130. Such a determination may be performed as described herein. (FIG. 10). If thread T did miss an opportunity to improve performance, the IFU 208 increments the maximum allowed group count of thread T by a third predetermined value, as shown at 1132. In one or more examples, the first and third predetermined values are identical.

Further, the IFU 208 monitors if a reset event has occurred, as shown at 1140. In case of the reset event, the IFU 208 resets the maximum allowed group count of thread T to a default value, which is the maximum value the maximum allowed group count of thread T can be set. The reset event may include any one or more of hardware reset events, an SMT mode change for the processor 112, a context switch, and/or a change to program status word of the processor 112.

Thus, by maintaining the attribute values of minimum group count, maximum allowed group count, and a group count in the pipeline, for each thread T of the processor 112, the IFU 208 facilitates balancing the load for each thread, and in turn improves the performance of the processor 112. The minimum group count ensures that at least a specific number of groups are dispatched for the thread T, so as to keep the performance of the thread T above a predetermined threshold. The maximum allowed group count for the thread ensures that the thread T does not self-starve, or starve another thread. The maximum allowed group count further ensures that the thread T is not missing any opportunity to increase performance. Further yet, the number of groups in the pipeline for the thread tracks a number of groups in the pipeline since dispatch that have already been assigned to the thread, which is used for adjusting the maximum allowed group count of the thread.

In one or more examples, the IFU 208 updates the attributes of the threads periodically based on a predetermined interval. Alternatively, or in addition, the IFU updates the attributes in response to one or more events, such as completion of a group, reset, change of SMT mode, or any other event. Changing the SMT mode of the processor 112 is to change a number of simultaneous threads the processor 112 uses for executing instructions. For example, the processor 112 may change the number of threads between 2, 4, 8, 16, 32, and or any other positive integer.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A computer implemented method for load-balancing a plurality of simultaneous threads of a processor, the method comprising:
   computing a maximum allowed group count for a thread from the plurality of simultaneous threads, the maximum allowed group count indicative of a maximum number of groups of instructions to be assigned to the thread;
   determining that the thread is starved by the maximum allowed group count for the thread;
   in response to the thread being starved, incrementing the maximum allowed group count of the thread; and
   issuing one or more groups of instructions for execution by the thread based on a minimum group count and the maximum allowed group count for the thread.

2. The computer implemented method of claim 1, further comprising:
   computing a completion rate for the thread, the completion rate indicative of a number of groups of instructions completed by the thread over a predetermined number of instruction cycles; and
   determining a minimum group count for the thread based on the completion rate, the minimum group count indicative of a minimum number of groups of instructions to be assigned to the thread.

3. The computer implemented method of claim 2, wherein computing the completion rate for the thread comprises monitoring completion of a number of groups using an adjustable window.

4. The computer implemented method of claim 1, wherein the thread is determined to be starved based on the thread not being in an issue queue of the processor, the number of groups of instructions assigned to the thread matching the maximum allowed group count of the thread, and the thread not being blocked for dispatch.

5. The computer implemented method of claim 1, wherein the thread is a first thread, and wherein computing the maximum allowed group count for the thread comprises:
   determining that the first thread is starving a second thread, and in response decrementing the maximum allowed group count of the first thread.

6. The computer implemented method of claim 5, wherein the first thread is determined to be starving the second thread based on:
the second thread not being in an issue queue of the processor,
the first thread being ahead of the second thread in dispatch order, and
the first thread and the second thread not being blocked for dispatch.

7. The computer implemented method of claim 6, wherein the first thread is determined to be starving the second thread further based on the second thread being dispatched at least once since last flush of an instruction pipeline by the processor.

8. The computer implemented method of claim 1, wherein computing the maximum allowed group count for the thread comprises:
determining that the thread missed an execution cycle, and in response incrementing the maximum allowed group count of the thread.

9. The computer implemented method of claim 8, wherein the thread is determined to have missed an execution cycle based on:
the thread not starving another thread,
none of the other threads being dispatched, and
the number of groups of instructions assigned to the thread being lesser than the maximum allowed group count for the thread.

10. A processing system for load-balancing a plurality of simultaneous threads of a processor, the system comprising:
an instruction decode unit; and
an instruction fetch unit in communication with the instruction decode unit, the instruction fetch unit configured to:
compute a maximum allowed group count for a thread from the plurality of simultaneous threads, the maximum allowed group count indicative of a maximum number of groups of instructions to be assigned to the thread;
determine that the thread is starved by the maximum allowed group count for the thread;
in response to the thread being starved, increment the maximum allowed group count of the thread; and
issue one or more groups of instructions for execution by the thread based on a minimum group count and the maximum allowed group count for the thread.

11. The system of claim 10, wherein the instruction fetch unit is further configured to compute a minimum group count for the thread based on a group completion rate of the thread, the minimum group count indicative of a minimum number of groups of instructions to be assigned to the thread.

12. The system of claim 11, wherein computing the completion rate for the thread comprises monitoring completion of a number of groups using an adjustable window.

13. The system of claim 10, wherein the thread is determined to be starved based on the thread not being in an issue queue of the processor, the number of groups of instructions assigned to the thread matching the maximum allowed group count of the thread, and the thread not being blocked for dispatch.

14. The system of claim 10, wherein the thread is a first thread, and wherein computing the maximum allowed group count for the thread comprises:
determining that the first thread is starving a second thread, and in response decrementing the maximum allowed group count of the first thread.

15. The system of claim 10, wherein computing the maximum allowed group count for the thread comprises:
determining that the thread missed an execution cycle, and in response incrementing the maximum allowed group count of the thread.

16. A computer program product for load-balancing a plurality of simultaneous threads of a processor, the computer program product comprising a computer readable storage medium, the computer readable storage medium comprising computer executable instructions, wherein the computer readable storage medium comprises instructions to:
compute a maximum allowed group count for a thread from the plurality of simultaneous threads, the maximum allowed group count indicative of a maximum number of groups of instructions to be assigned to the thread;
determine that the thread is starved by the maximum allowed group count for the thread;
in response to the thread being starved, increment the maximum allowed group count of the thread; and
issue one or more groups of instructions for execution by the thread based on a minimum group count and the maximum allowed group count for the thread.

17. The computer program product of claim 16, wherein the thread is determined to be starved based on the thread not being in an issue queue of the processor, the number of groups of instructions assigned to the thread matching the maximum allowed group count of the thread, and the thread not being blocked for dispatch.

18. The computer program product of claim 16, wherein the thread is a first thread, and wherein computing the maximum allowed group count for the thread comprises:
determining that the first thread is starving a second thread, and in response decrementing the maximum allowed group count of the first thread.

19. The computer program product of claim 18, wherein the first thread is determined to be starving the second thread based on:
the second thread not being in an issue queue of the processor,
the first thread being ahead of the second thread in dispatch order, and
the first thread and the second thread not being blocked for dispatch.

20. The computer program product of claim 19, wherein the first thread is determined to be starving the second thread further based on the second thread being dispatched at least once since last flush of an instruction pipeline by the processor.

* * * * *